(12) United States Patent  
Kujirai

(10) Patent No.: US 8,775,313 B2  
(45) Date of Patent: *Jul. 8, 2014

(54) PRINTING CONTROL METHOD, APPARATUS AND STORAGE MEDIUM THEREFOR, AND PRINTING SYSTEM

(75) Inventor: Yasuhiro Kujirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 757 days.

This patent is subject to a terminal disclaimer.

(21) Appl. No.: 11/329,189

(22) Filed: Jan. 11, 2006

(65) Prior Publication Data

US 2006/0119892 A1 Jun. 8, 2006

Related U.S. Application Data

(62) Division of application No. 09/847,417, filed on May 3, 2001, now Pat. No. 7,002,707.

(30) Foreign Application Priority Data

May 9, 2000 (JP) ................................ 2000-136157

(51) Int. Cl.
*G06Q 99/00* (2006.01)
*G06Q 20/20* (2012.01)

(52) U.S. Cl.
CPC .......... *G06Q 20/206* (2013.01); *G06Q 2220/10* (2013.01)
USPC .......................................................... 705/51

(58) Field of Classification Search
USPC .......................................... 705/50–51, 55–56
See application file for complete search history.

(56) References Cited

U.S. PATENT DOCUMENTS

| | | | | |
|---|---|---|---|---|
| 5,239,622 A * | 8/1993 | Best et al. | ..................... | 358/1.18 |
| 5,720,015 A * | 2/1998 | Martin et al. | ................ | 358/1.15 |
| 5,869,824 A * | 2/1999 | Okada et al. | .................. | 235/380 |
| 5,970,218 A | 10/1999 | Mullin et al. | ................ | 358/1.15 |
| 5,995,723 A * | 11/1999 | Sperry et al. | ................. | 358/1.15 |
| 5,999,707 A * | 12/1999 | Taniguchi et al. | ........... | 358/1.15 |
| 6,119,117 A * | 9/2000 | Yoda et al. | ..................... | 715/200 |
| 6,307,640 B1 * | 10/2001 | Motegi | ......................... | 358/1.14 |
| 6,535,297 B1 * | 3/2003 | Steele et al. | ................. | 358/1.15 |
| 6,674,537 B2 * | 1/2004 | Kadowaki | .................... | 358/1.15 |
| 6,678,068 B1 * | 1/2004 | Richter et al. | ............... | 358/1.15 |

FOREIGN PATENT DOCUMENTS

| | | |
|---|---|---|
| JP | 9-212320 | 8/1997 |
| JP | 11165446 | 6/1999 |

OTHER PUBLICATIONS

Bunker, K., "Display and Edit of Job Names Stored on a Memory Card", 2381 Xerox Disclosure Journal, vol. 20, No. 1, 1995, p. 35.

* cited by examiner

*Primary Examiner* — James D Nigh

(74) *Attorney, Agent, or Firm* — Fitzpatrick, Cella, Harper & Scinto

(57) ABSTRACT

In a printing control apparatus and method for performing printing by a printing device based upon a print job, a password corresponding to a print job is entered and print data with the accompanying password is generated and sent from a host computer to a printer, where the print data is to be printed. The host computer is capable of setting any information for the document name and user name associated with the print job. When the printer receives and prints the print data to which the password has been appended, the printer displays the user name and document name associated with the print job and performs printing in response to entry of the corresponding password by the user.

73 Claims, 19 Drawing Sheets

F I G. 2
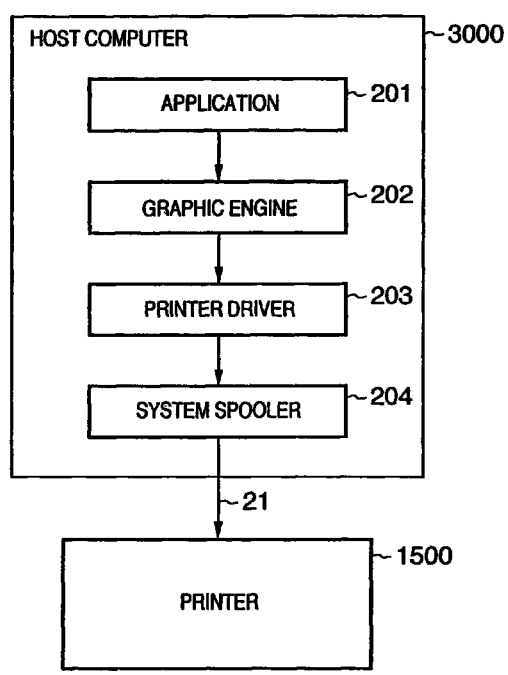

FIG. 4

| | TIME | JOB NAME | USER | STATUS |
|---|---|---|---|---|
| 🔒 | 17 : 30 | ConfidentialDoc | Manager | Waiting |
| 🔒 | 17 : 31 | ABCD | Who am I | Waiting |

Secured Print

F I G. 7
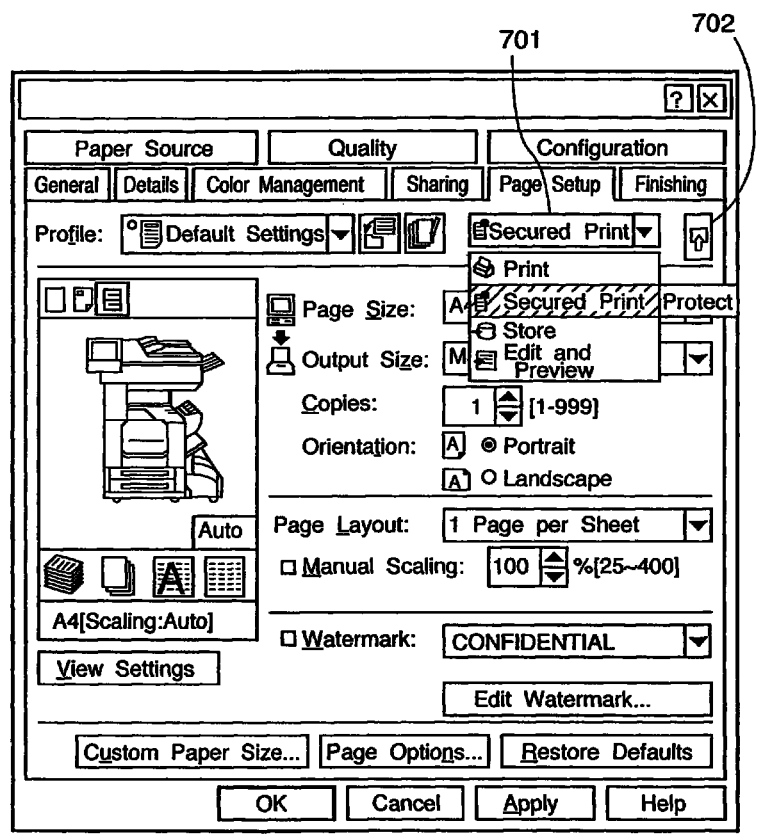

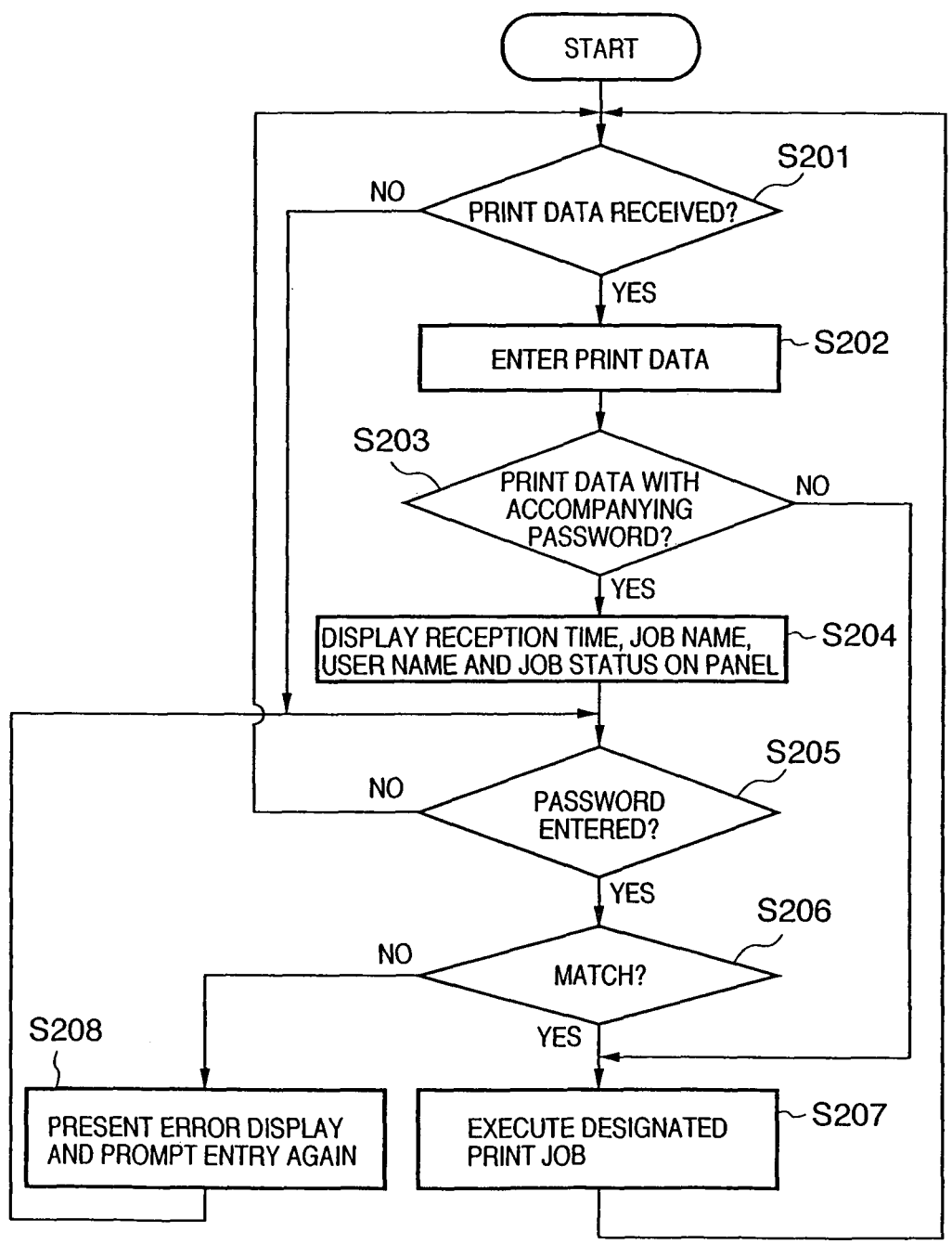
F I G. 14

000
PRINTING CONTROL METHOD, APPARATUS AND STORAGE MEDIUM THEREFOR, AND PRINTING SYSTEM

CROSS-REFERENCE TO RELATED APPLICATIONS

This application is a divisional application of application Ser. No. 09/847,417, now allowed, filed May 3, 2001, which is incorporated herein by reference.

FIELD OF THE INVENTION

This invention relates to a printing control method and apparatus for performing printing based upon print data to which user identification information has been attached, and to a storage medium storing a program for implementing this control method.

BACKGROUND OF THE INVENTION

In a known printing system, a user employs a host computer to create print data upon attaching password information (identification information) and to transmit the print data to a printer so that confidential printing can be performed. In this case, the printing apparatus is capable of printing the print data only when the user enters the correct password information that was attached to the print data.

If the printing apparatus is a shared printer connected to a network, such a printing system is useful when a user does not wish another person to see a printout or when a document having confidential items or the like that must not be revealed to other parties is to be printed.

With a conventional printing system of this kind, however, the secrecy of a printout is maintained but such information as the name of the confidential document and the name of the transmitting party is displayed on the control panel of the printing apparatus. The result is a decline in confidentiality regarding displayed document and user names.

SUMMARY OF THE INVENTION

Accordingly, an object of the present invention is to provide a printing control method, apparatus, storage medium and printing system in which the confidentiality of print processing is enhanced by making it possible to change at least the document name or user name associated with a print job.

In order to attain the above object, the printing control apparatus of the present invention is a printing control apparatus for performing printing by a printing device based upon a print job, comprises: setting means for setting identification information corresponding to the print job, and modifying means for enabling modification of at least one of a user name and document name of the print job to which the identification information set by said setting means has been appended.

Further, in order to attain the above object, the printing control method of the present invention is a printing control method in a printing system having a host computer for creating a print job, and a printing device for performing printing upon receiving the print job from the host computer. The method comprises a setting step of setting identification information corresponding to the print job; a modifying step of modifying of at least one of a user name and document name of the print job to which the identification information set in said setting step has been appended; a step of transmitting the print job to said printing device; a determination step of inputting identification information and determining whether this identification information matches identification information corresponding to a received job; and a step of executing the print job corresponding to said identification information if a match is determined at said determination step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 2 is a block diagram illustrating the structure of a program in a typical printing system to which a host computer and a printer are connected in accordance with a first embodiment of the invention;

FIG. 4 is a diagram illustrating an example of a display presented on a control panel of a printer according to this embodiment;

FIG. 7 is a diagram showing an example of a display on a printer-driver GUI displayed on a host computer according to this embodiment;

FIG. 14 is a flowchart illustrating password verification processing in a printer according to the first embodiment;

DESCRIPTION OF THE PREFERRED EMBODIMENTS

Preferred embodiments of the present invention will now be described in detail with reference to the accompanying drawings.

First Embodiment

Figure 1:
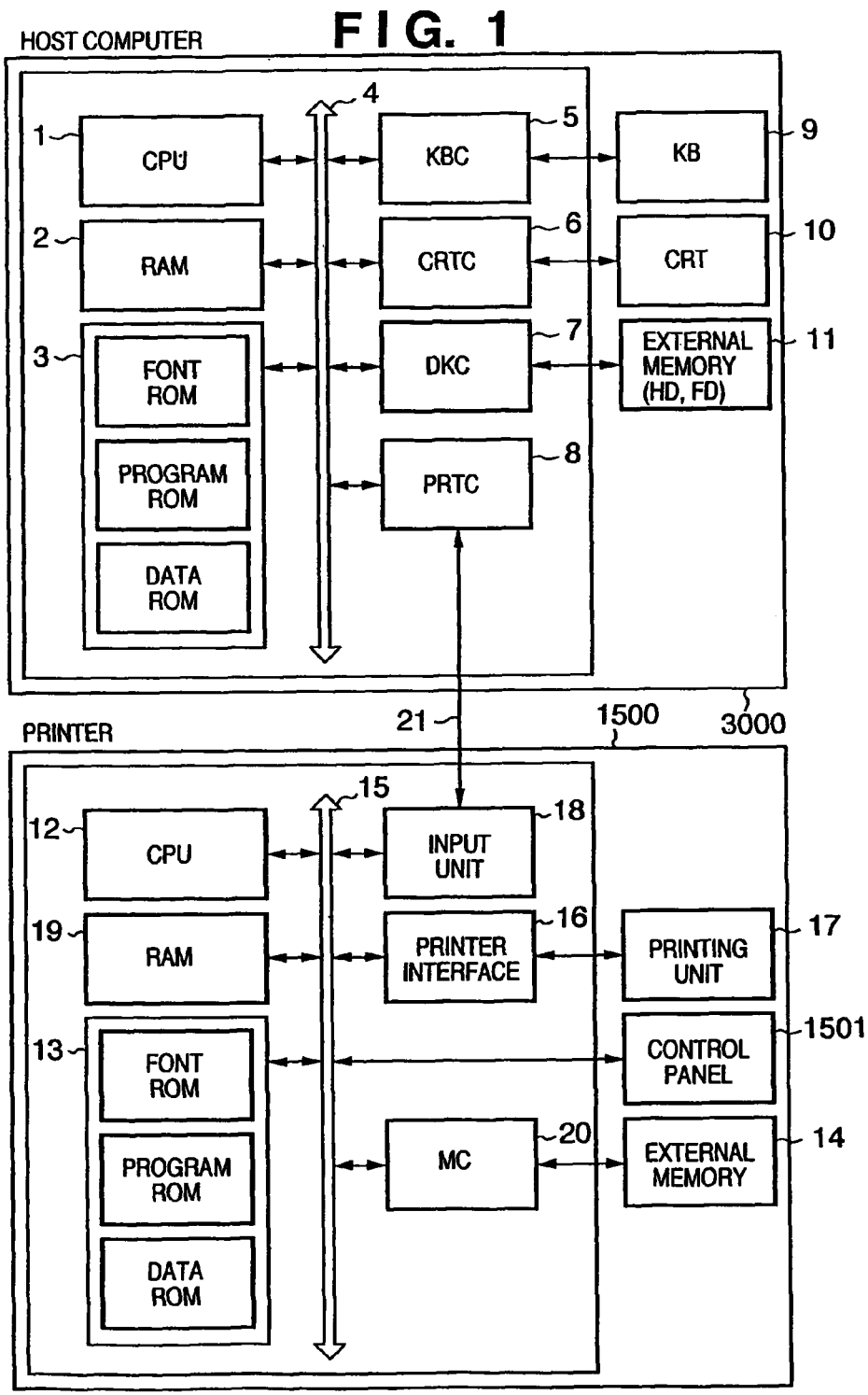
FIG. 1 is a block diagram illustrating the configuration of a printing system according to an embodiment of the present invention.

FIG. 1 is a block diagram useful in describing the configuration of a printer control system according to an embodiment of the present invention. It should be noted that as long as the functions according to this embodiment are implemented, then, if not stated otherwise, the arrangement of the invention may be a stand-alone device, a system comprising a plurality of devices or a system in which processing is executed upon making a connection via a network such as a LAN or WAN. Further, the printing control apparatus of the present invention may be incorporated in the printing apparatus of a printer or may be an apparatus that is connected to a printing apparatus via a LAN or the like in order to control the printing apparatus, as in the manner of a host computer.

The system shown in FIG. 1 includes a host computer 3000 having a CPU 1 which, on the basis of a program ROM in a ROM 3 or a document processing program stored in an external memory 11, loaded into a RAM 2 and executed, executes the processing of a document containing mixed objects such as graphics, images, text and tables (inclusive of spreadsheets, etc.). The CPU 1 performs overall control of various devices connected to a system bus 4. An operating system (OS) program, which is the control program of the CPU 1, has been stored in a program ROM of the ROM 3 or in the external memory 11. Font data, etc. used when the above-mentioned document processing is executed has been stored in a font ROM of the ROM 3 or in the external memory 11. Various data used when the above-mentioned document processing is executed has been stored in a data ROM of the ROM 3 or in the external memory 11. The RAM 2 functions as the main memory and work area of the CPU 1. A keyboard controller (KBC) 5 controls inputs from a keyboard 9 and pointing device, which is not shown. A CRT controller (CRTC) 6 controls the display on a CRT display (CRT) 10. A disk controller (DKC) 7 controls access to the external memory 11, such as a hard disk (HD) or floppy disk (FD), which stores a booting program, various application programs, font data, user files, edited files and a program (referred to as a "printer driver" below) for generating printer control commands. A printer controller (PRTC) 8, which is connected to a printer 1500 via a bidirectional interface 21, executes processing for controlling communication with the printer 1500.

The CPU 1 executes processing to expand (rasterize) outline fonts to a display-information RAM set up in, say, the RAM 2, and is capable of implementing a WYSIWYG (What You See I What You Get) function on CRT 10. Further, on the basis of commands designated by a mouse cursor (not shown) on the CRT 10, the CPU 1 opens various windows that have been registered and executes a variety of data processing. When printing is executed, the user opens a window relating to printing settings, sets the printer and sets a print processing method in regard to the printer driver, the setting including the selection of a printing mode.

The structure of printer 1500 will now be described.

The printer 1500 is controlled by a CPU 12. On the basis of a control program, etc., stored in a program ROM of a ROM 13 or a control program, etc., stored in an external memory 14, the printer CPU 12 outputs an image signal, which serves as output information, to a printing unit (printer engine) 17 connected to a system bus 15. A control program of the CPU 12 is stored in a program ROM of the ROM 13. Font data used when the above-mentioned output information is generated is stored in a font ROM of the ROM 13. In case of a printer not equipped with the external memory 14 such as a hard disk, information utilized in the host computer 3000 is stored in a data ROM of the ROM 13. The CPU 12, which can execute processing for communicating with the host computer via an input unit 18, is capable of notifying the host computer 3000 of information internal to the printer 1500. A RAM 19, which functions as the main memory and work area of the CPU 12, is so adapted that memory capacity can be expanded by optional RAM connected to an expansion port, not shown. The RAM 19 is used as an area for expanding output information, as an area for storing environment data and as an NVRAM (non-volatile RAM). The external memory 14, such a hard disk (HD) or IC card, has its access controlled by a memory controller (MC) 20. The external memory 14, which is connected to the printer as an option, stores font data, an emulation program and form data, etc. It should be noted that if the external memory 14 does not exist, hard disk per se may be included in the main controller (MC) 20. Further, a control panel 1501 has an array of operation switches and LED indicators. The external memory 14 is not limited to a single memory. A plurality of these memories can be provided and an arrangement may be adopted in which a plurality of optional font cards or a plurality of external memories storing programs for interpreting printer control languages of different language systems can be connected to the apparatus. Furthermore, the external memory 14 may have an NVRAM (not shown) for storing printer mode setting information from the control panel 1501.

FIG. 2 is a functional block diagram for describing various functions in a printer control system in which the host computer 3000 and printer 1500 are connected via a cable or network, as shown in FIG. 1.

An application 201, graphic engine 202, printer driver 203 and system spooler 204 are retained in the external memory 11 of host computer 3000 as files. These are program modules which, when they are to be executed, are loaded in the RAM 2 and executed by the operating system and by modules which utilize these modules. The application 201 and the printer driver 203 can be stored on a floppy disk or CD-ROM of the external memory 11 or can be stored on the hard disk of the external memory 11 via a network, not shown. The application 201 stored in the external memory 11 is executed upon being loaded in the RAM 2. When the application 201 performs printing using the printer 1500, output (rendering) is performed utilizing the graphic engine 202, which likewise is capable of being executed upon being loaded in the RAM 2. The graphic engine 202 loads the printer driver 203, which is prepared for each printer, from the external memory 11 to the RAM 2 and sets the output from the application 201 in the printer driver 203. The graphic engine converts a GDI (Graphic Device Interface) function, which is received from the application 201, to a DDI (Device Driver Interface) function and outputs the DDI function to the printer driver 203. On the basis of the DDI function received from the graphic engine 202, the printer driver 203 makes a conversion to a control command, e.g., PDL (Page Description Language), that is capable of being recognized by the printer 1500. The printer control command obtained by the conversion is output to the printer 1500 as print data via a system spooler 204, which has been loaded in the RAM 2 by the operating system, through an interface 21.

Figure 4:
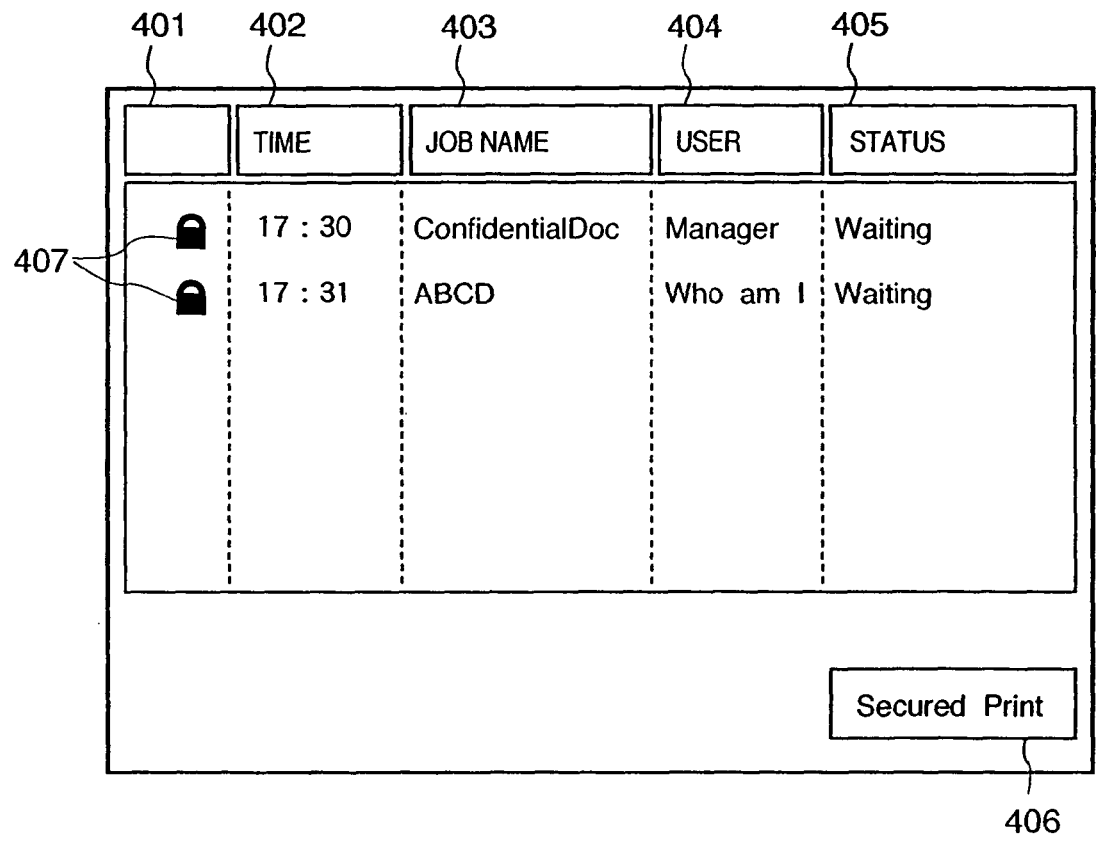

FIG. 4 is a diagram illustrating an example of a display on the control panel 1501 of the printer 1500 according to this embodiment in a case where print data with an accompanying password has been received from the host computer 3000. Print data with an accompanying password is created by incorporating a user ID in print data when the print data is created by the host computer 3000. Upon receiving this print data with an accompanying password, the printer 1500 will execute printing only after an ID (password) identical with the user ID is input to the printer. The example of FIG. 4 illustrates a case where the printer is in a standby state in which two items of print data with accompanying passwords have been received.

The display shown in FIG. 4 includes an area 401 which indicates whether print data is print data with an accompanying password. If the data is print data with an accompanying password, a "locked" icon 407 is displayed in this area. An area 402 displays the time at which print data was received from the host computer 3000, an area 403 displays the job name associated with the print data, an area 404 displays the user name associated with the print data, and an area 405 displays the present status of the print job. In the example of FIG. 4, the status of both print jobs is "WAITING". Also displayed is a button 406 that allows the user to call an input screen that is for entering a password. Specifically, the printer 1500 is such that if the print data is print data with an accompanying password, processing for printing this print data will not be executed unless the user of printer 1500 enters a password identical with that of the print data with the accompanying password. Thus, the confidentiality of a printout produced by the printer 1500 is maintained.

Figure 5:
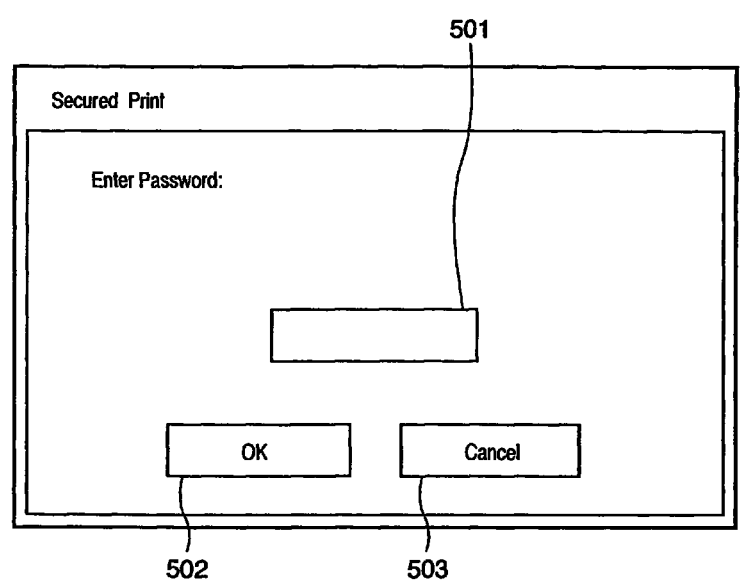
FIG. 5 is a diagram showing an example of a password input screen displayed on the control panel of the printer according to this embodiment.

FIG. 5 is a diagram illustrating an example of the password input screen displayed on the display unit of the control panel 1501 immediately after one item of print data in FIG. 4 is designated and the button 406 is clicked in a state where multiple items of print data are shown waiting in FIG. 4.

An input area 501 in FIG. 5 indicates an area for entering a password. By entering a password in area 501 and clicking an OK button 502, the entered password will be compared with the password that has been assigned to the designated waiting print job. If the password entered in the area 501 matches the password of the corresponding print job, the print job is executed and printing is performed. If the two passwords do not match, a message reading "ENTER CORRECT PASSWORD" is displayed, as indicated at 601 in FIG. 6, whereby the user is prompted to re-enter a password in the input area 501. To cancel print processing, the user clicks a cancel button 503.

FIG. 7 is a diagram showing an example of the GUI of the printer driver 203 displayed on the display unit 10 of the host computer 3000. Here FIG. 7 illustrates an example of a window display particularly in a case where printing of "print data with password" is set.

Figure 8:
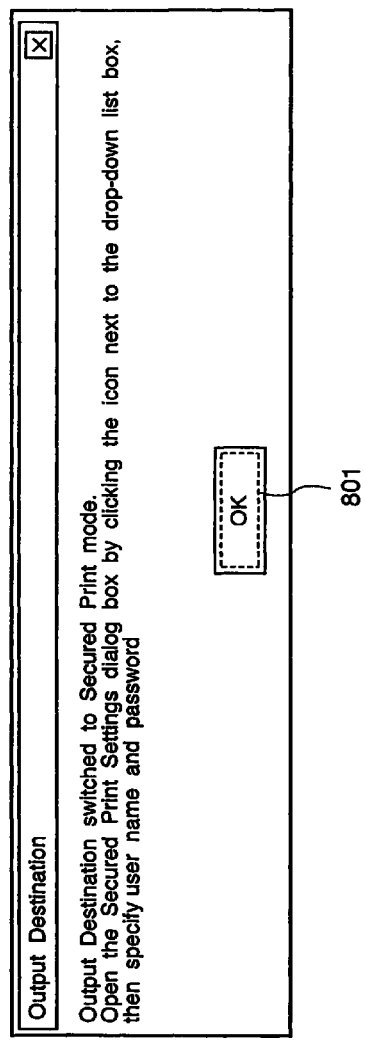
FIG. 8 is a diagram showing an example of display of a confirmation method displayed immediately after printing with password has been set using the host computer according to this embodiment.

By selecting "SECURED PRINT" indicated at 701 in FIG. 7, it becomes possible to designate printing of print data having an accompanying password. Immediately after printing of print data with an accompanying password is designated, a confirmation message of the kind shown in FIG. 8 is displayed. This message allows the user to confirm selection of the setting for printing the print data having the accompanying password and instructs the user to enter a user name and password. Clicking an OK button 801 returns processing to the GUI of FIG. 7.

Figure 9:
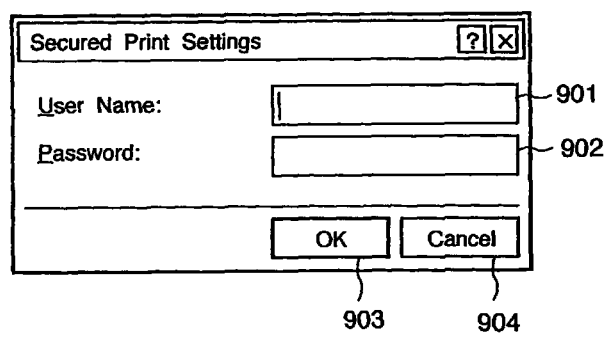
FIG. 9 is a diagram showing an example of a dialog display for entering information relating to print data with an accompanying password using the host computer according to this embodiment.
Figure 10:
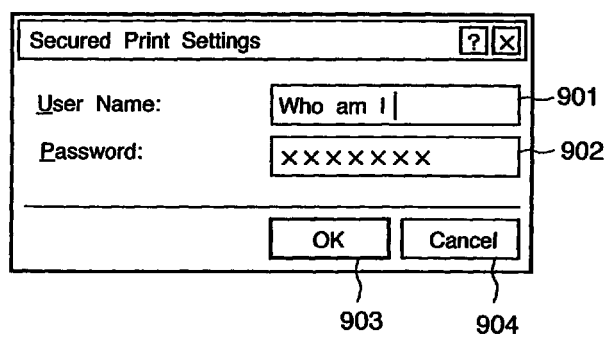
FIG. 10 is a diagram showing an example of input of information relating to print data with an accompanying password using the host computer according to this embodiment.

If a button 702 is clicking in the state shown in FIG. 7, a dialog screen shown in FIG. 9 is displayed. Here the user enters any user name (it is not required that this match the actual name of the user) in a user name input area 901 and enters a password in a password input area 902 (the entered password, however, is not displayed) (see FIG. 10), whereby the user name and password are set for the print data having the accompanying password. In FIGS. 9 and 10, an OK button 903 is for finalizing inputs made on the dialog screen, and a cancel button 904 is for canceling inputs made on the dialog screen.

Figure 11:
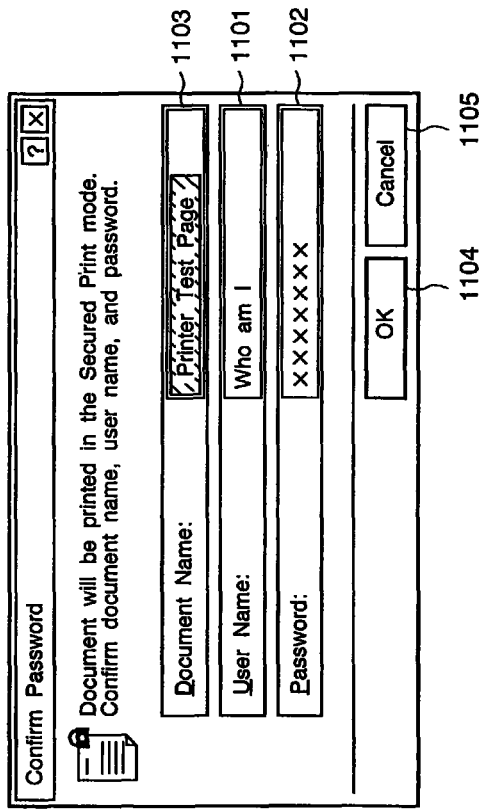
FIG. 11 is a diagram showing an example of a dialog display presented immediately after issuance of a print instruction from an application relating to print data with an accompanying password using the host computer according to this embodiment.

FIG. 11 is a diagram showing an example of a dialog screen displayed on the display unit 10 immediately after issuance of a print instruction from an application when printing based upon print data with an accompanying password has been selected using the host computer 3000.

The user name entered in the area 901 shown in FIG. 9 is displayed in an area 1101, and the password information entered in area 902 shown in FIG. 9 is displayed as "******". Further, since the printer driver 203 is capable of acquiring the document name from the print data, the printer driver displays the document name ("PRINTER TEST PAGE" in this case) in an area 1103. By using this displayed dialog screen, the user is capable of changing and editing the document name and user name shown in FIG. 11.

Figure 12:
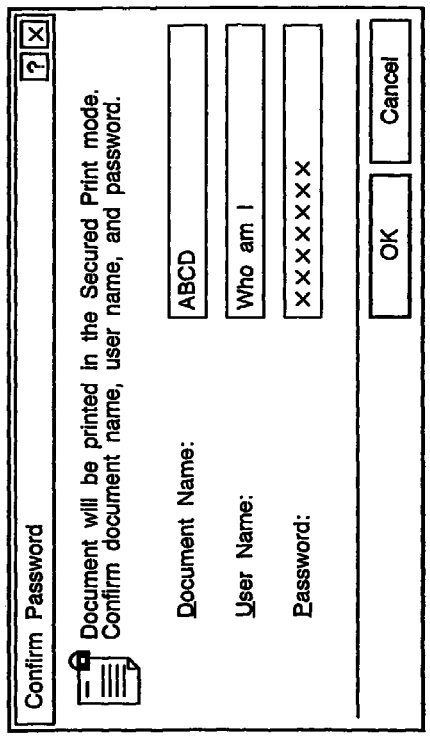
FIG. 12 is a diagram showing an example of a dialog display presented immediately after issuance of a print instruction from an application relating to print data with an accompanying password using the host computer according to this embodiment, this diagram illustrating a case where a document name in FIG. 11 has been changed.

In FIG. 12, the document name has been changed from "PRINTER TEST PAGE", which is shown in FIG. 11, to "ABCD". Since the user can thus set any name for the document name or user name, the degree of security can be enhanced also with regard to document names and user names.

Further, by using the dialog screen shown in FIG. 11, the user can set a user name, document name and password whenever printing is performed. If an OK button 1104 is clicked, printing is executed. If a cancel button 1105 is clicked, on the other hand, the printing operation is canceled.

Figure 13:
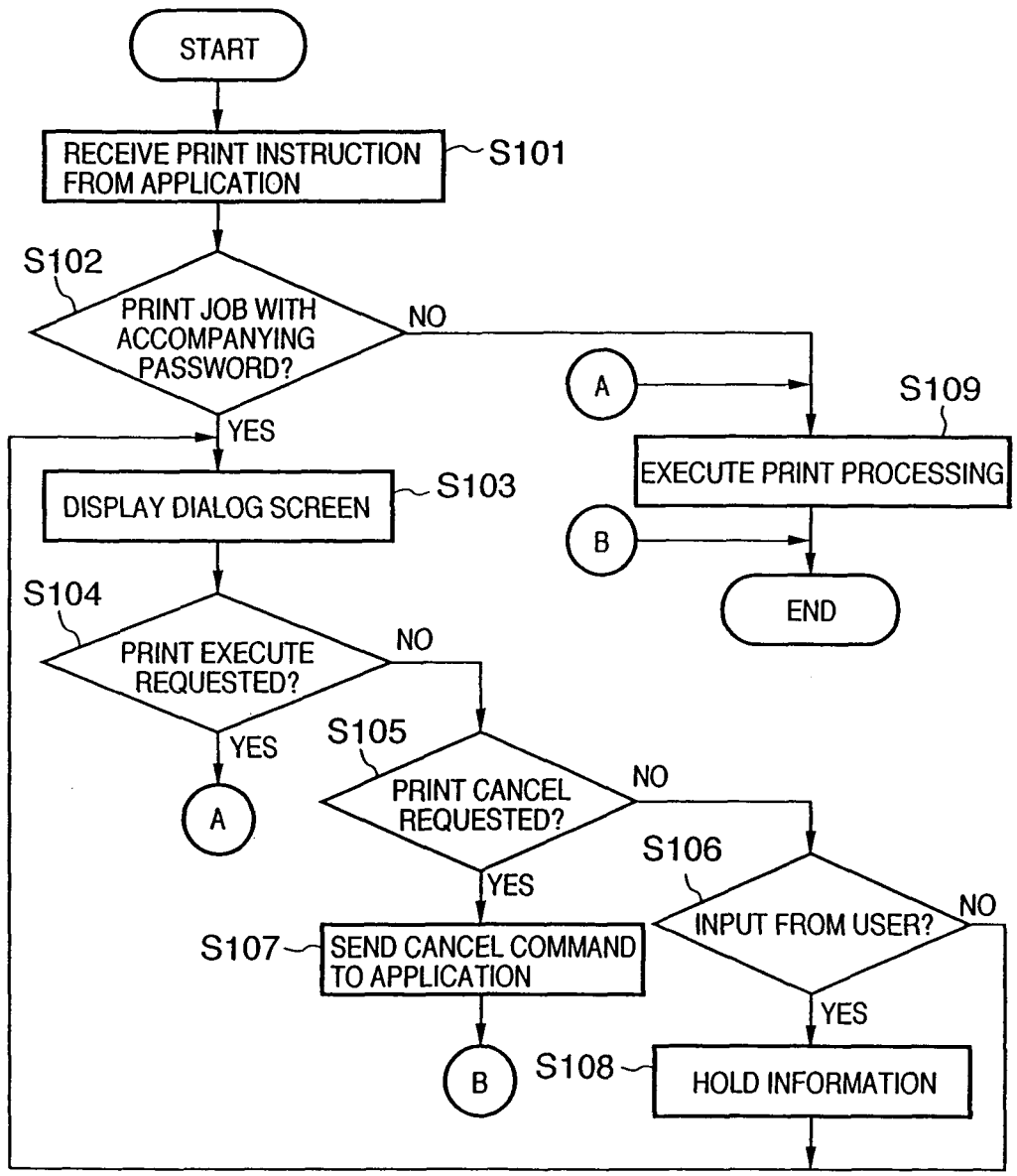
FIG. 13 is a flowchart illustrating print processing executed by the host computer according to the first embodiment.

FIG. 13 is a flowchart illustrating print processing executed by the host computer 3000 according to the first embodiment of the invention.

If a print instruction is received from the application 201 at step S101 in FIG. 13, control proceeds to step S102, at which the host computer determines whether the print job is for printing based upon print data with an accompanying password. This is achieved by determining whether "SECURED PRINT" has been designated at 701 in FIG. 7 and whether the OK button 801 has been clicked in the display of FIG. 8. If printing based upon print data with an accompanying password has been designated, control proceeds to step S103; otherwise, control proceeds to step S109.

The dialog screen shown in FIG. 9 is displayed at step S103 and the host computer waits for an input event from the user employing the keyboard 9. Next, control proceeds to step S104. If the specified user name and password are finalized by the OK button in FIG. 9 and the OK button 1104 in FIG. 11 is clicked, the host computer judges that the input event is a print request, adds on the entered password information and executes print processing to send the results to the printer 1500 as a request to execute printing of the print data that uses the entered user name and document name.

If it is determined at step S104 that a print request has not been issued, control proceeds to step S105, at which it is determined whether the input event is a request to cancel printing. More specifically, the host computer determines whether the cancel button 1104 in FIG. 11 has been clicked. If this button has been clicked, control proceeds to step S107, at which the application is sent a print cancel instruction to terminate processing.

If it is found at step S105 that a request to cancel printing has not been issued, then control proceeds to step S106. Here the host computer determines whether the input event is an operation performed by the user for entering a document name, user name and password. If the answer is "YES", control proceeds to step S108, where the entered items of information are held in the corresponding memory areas (in RAM 2).

FIG. 14 is a flowchart illustrating print processing in the printer 1500 according to this embodiment.

The printer determines at step S201 whether a print job has been received from the host computer 3000. If a print job has been received, control proceeds to step S202, at which the printer stores the received print data in the RAM 19 by inputting it from the input unit 18. Next, at step S203, the printer determines whether the received print data is print data with an accompanying password. If the answer is "YES", control proceeds to step S204. If the answer is "NO", on the other hand, control proceeds to step S207, where the print job is executed and printing is performed.

In case of data with an accompanying password, control proceeds to step S204. Here reception time, job name, user name and status of each job are displayed, as shown for example in FIG. 4, on the display unit of control panel 1501 on printer 1500. Control then proceeds to step S205. If a plurality of print jobs are being displayed, one of these print jobs is designated by a cursor or the like and password processing for executing this print job is executed. When only one print job is being displayed, password processing for executing this print job is executed. Here the dialog screen shown in FIG. 5 is displayed on the control panel 1501 and the printer waits for entry of the password corresponding to the print job.

Figure 6:
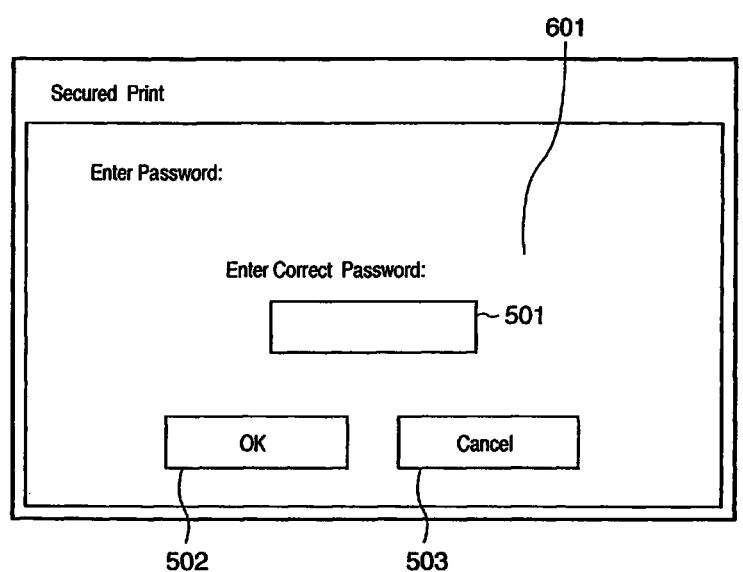
FIG. 6 is a diagram showing an example of a display in a case where an incorrect password has been entered on the password input screen displayed on the control panel of the printer according to this embodiment.

If the password has been entered, control proceeds to step S206, at which the printer compares the entered password with the password assigned to the print job and determines whether the two match. When there is a match, control proceeds to step S207 and the printer executes the designated print job. If a match is not found at step S207, however, control proceeds to step S208, where the dialog screen shown in FIG. 6 is displayed to prompt the user to enter the correct password. The processing of steps S205 to S206 and S208 is executed until the correct password is entered. Concurrently, processing for receiving the next item of print data is executed at steps S201 to S204.

Thus, in accordance with the printing system of the first embodiment, the host computer 3000 transmits print data with an accompanying password to the printer 1500. Upon receiving an input of the password corresponding to this print job, the printer 1500 proceeds to execute the print job and to perform printing. Further, since the host computer 3000 can set the document name, user name and password of the print job to any values, the job can be printed in such a manner that a third party cannot possibly ascertain who created the document nor the content of the document.

Second Embodiment

Figure 3:
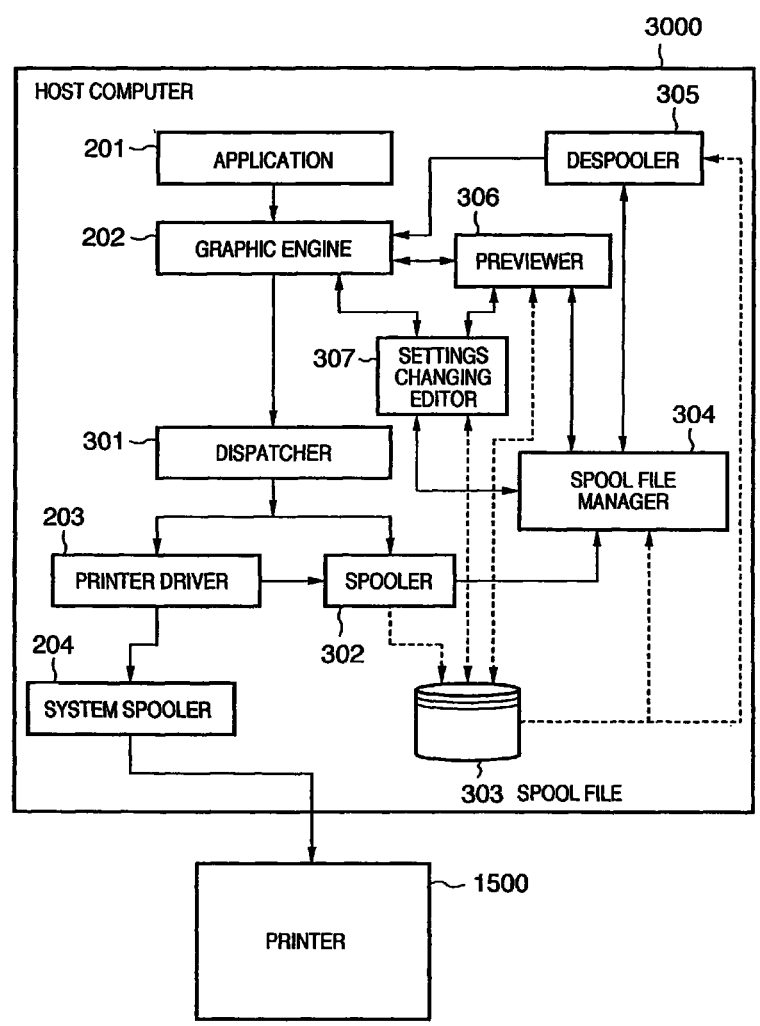
FIG. 3 is a block diagram illustrating the structure of a program in a typical printing system to which a host computer and a printer are connected in accordance with a second embodiment of the invention.

A printing system according to this embodiment may have an arrangement which, as shown in FIG. 3, spools print data from the application 201 temporarily in the form of intermediate code data. This arrangement is provided as an addition to the system comprising the printer 1500 and host computer 3000 implemented by the programs shown in FIG. 2.

FIG. 3 is a block diagram illustrating the structure of a program executed by the host computer 3000 according to a second embodiment of the invention.

A spool file 303 comprising intermediate codes is generated temporarily when a print instruction is sent from the graphic engine 202 to the printer driver 203 by the application 201. In the arrangement of FIG. 2 according to the first embodiment, the application 201 is freed from print processing at the moment the printer driver 203 finishes converting all print instructions from the graphic engine 202 to control commands for the printer 1500. In the arrangement of FIG. 3, on the other hand, the application 201 is freed from print processing at the moment a spooler 302 in the printer driver 203 converts all print instructions to intermediate code data and outputs the code data to a spool file 303. Ordinarily the arrangement according to the second embodiment requires a shorter period of time for print processing than the arrangement of the first embodiment.

Further, in the system shown in FIG. 3, the content of the spool file 303 can be manipulated. As a result, it is possible to realize multifarious page handling functions for print data from the application 201. For example, the print data can be enlarged or reduced in size and a plurality of pages may be printed upon being reduced to the size of a single page. Further, as will be described later, it is possible to combine print jobs, to perform editing such as page substitution and to preview data. Furthermore, by analyzing data to render a color/monochrome decision, it is possible to perform resource conserving printing that takes the printer function into account and to improve performance.

In order to attain these objectives, the printing system of the arrangement shown FIG. 2 is expanded in such a manner that print data is spooled in the form of intermediate codes as shown in FIG. 3. In order to manipulate the print data, the operator usually makes settings using a window provided by the printer driver 203.

The basic processing of the expanded scheme shown in FIG. 3 will now be described.

First, the print instructions from the graphic engine 202 are accepted by a dispatcher 301. In a case where a print instruction that the dispatcher 301 has accepted from the graphic engine 202 is a print instruction that the application 201 issued to the graphic engine 202, the dispatcher 301 loads the spooler 302, which has been stored in the external memory 11, into the RAM 2 and sends the print instruction to the spooler 302 and not the printer driver 203.

As a result, the spooler 302 converts the accepted print instruction to an intermediate code and outputs the code to the spool file 303. Further, the spooler 302 acquires the manipulation settings, which relate to print data set in the printer driver 203, from the printer driver 203 and stores the data in the spool file 303. Though the spool file 303 is generated as a file in the external memory 11, the file may be generated in the RAM 2. Furthermore, the spooler 302 loads a spool file manager 304, which has been stored in the external memory 11, and notifies the spool file manager 304 of the status of spool file generation. In accordance with the content of the manipulation settings relating to the print data stored in the spool file 303, the spool file manager 304 subsequently determines whether printing can be performed.

When the spool file manager 304 has judged that printing can be performed utilizing the graphic engine 202, the spool file manager 304 loads a despooler 305, which has been stored in the external memory 11, into the RAM 2 and instructs the despooler 305 to perform printing of the intermediate codes described in the spool file 303. As a result, in accordance with the content of manipulation settings included in the spool file 303, the despooler 305 manipulates the intermediate codes contained in the spool file 303 and outputs them again via the graphic engine 202.

In a case where a print instruction which the dispatcher 301 receives from the graphic engine 202 is a print instruction sent from the despooler 305 to the graphic engine 202, the dispatcher 301 sends the print instruction to the printer driver 203 and not the spooler 302. As a result, the printer driver 203 generates a printer control command and sends the command to the system spooler 204.

Furthermore, according to the second embodiment, the expanded system described thus far is provided with a previewer 306 and a settings changing editor 307, as shown in FIG. 3, to make it possible to perform previewing, to change print settings and to combine a plurality of jobs.

Figure 15:
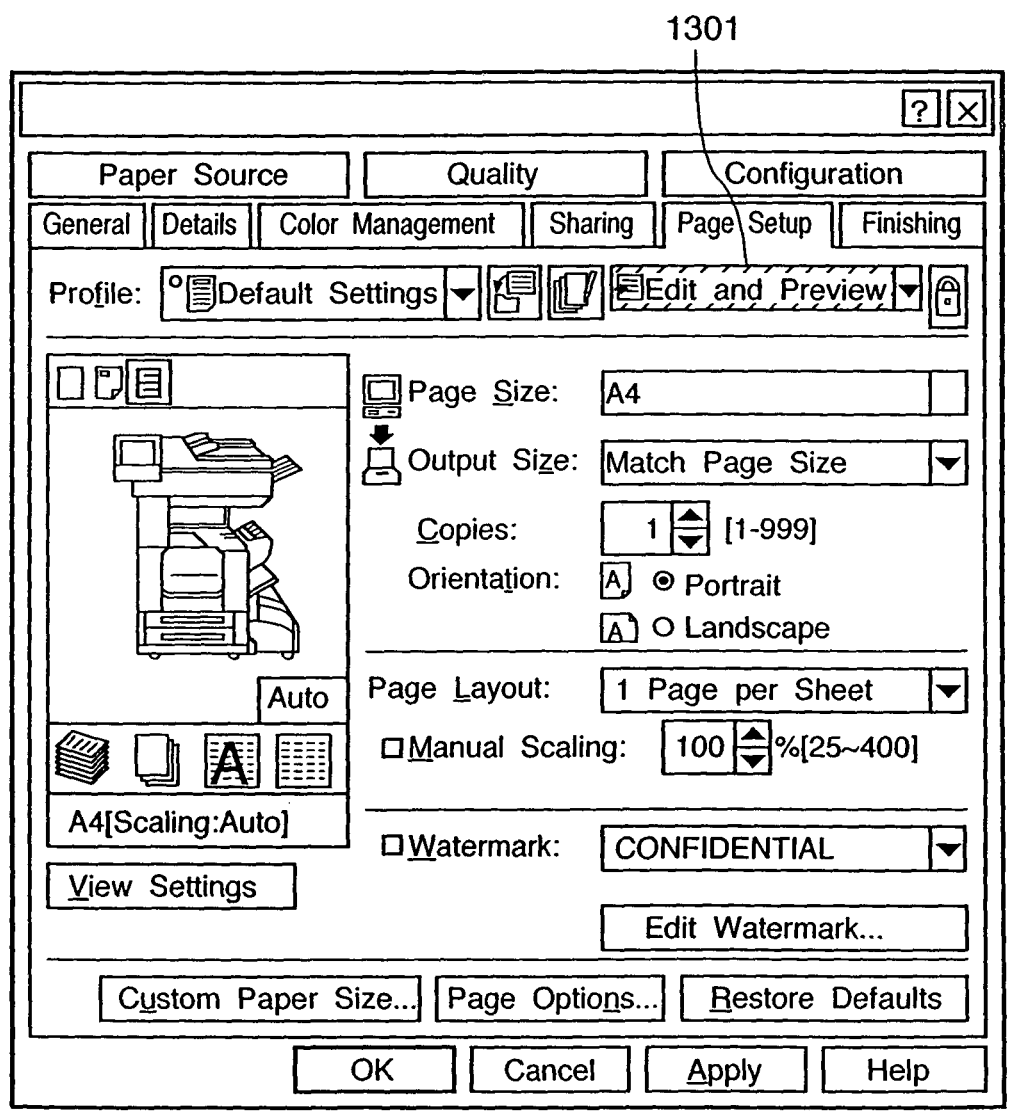
FIG. 15 is a diagram showing an example of a printer-driver GUI that has been configured so as to perform a change in print setting as well as print preview in the second embodiment of the invention.

In order to perform print previewing, change print settings and combine multiple jobs, "EDIT AND PREVIEW" is designated in the properties of the printer driver 203, as shown at 1301 in FIG. 15, using a pull-down menu serving as means for designating an output destination.

The content thus set in the properties of the printer driver 203 is stored as a settings file in the structure provided by the operating system (in the Windows operating system, the structure is referred to as "DEVMODE"). This structure includes a setting as to whether the spool file manager 304 is to perform storage in the manipulation settings contained in the spool file 303. The spool file manager 304 reads in the manipulation settings via the printer driver 203 and, if the store designation has been made, generates a page description file and a job settings file and stores these in the spool file 303 in the manner set forth above.

Figure 16:
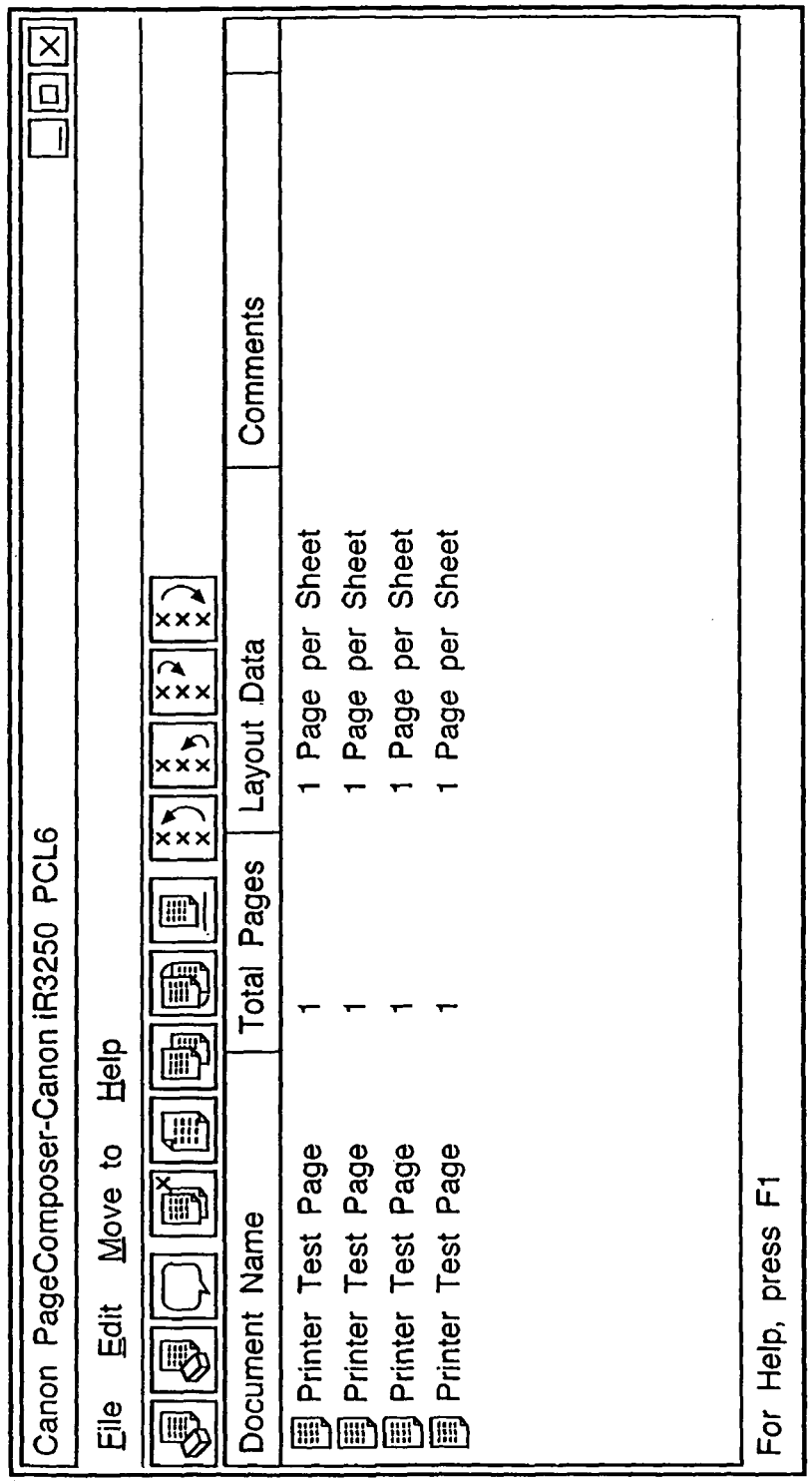
FIG. 16 is a diagram showing an example of a GUI displayed when a change in print setting and print preview are performed.

As shown in FIG. 16, the window screen of the spool file manager 304 pops up and the jobs that have been spooled in the spool file 303 are displayed in list form.

FIG. 16 shows an example in which four print jobs have been spooled. A print job can be operated on by designating a menu bar or an immediately underlying menu icon. The number of operations of the menu bar and the number of operations of the menu icons are the same.

There are 11 types of operations available when a job has been selected, namely: PRINT; PROOF PRINT, in which a spool file of intermediate code is left as is and printed; PRINT PREVIEW, which is for viewing an output preview of a job that takes print settings into consideration; DELETE, which is for deleting a spool file of intermediate code; DUPLICATE, which is for generating a copy of a spool file of intermediate code; COMBINE, in which a plurality of jobs of spool files of intermediate code are combined into a single job; SEPARATE, which is for separating a combined job into the plurality of original jobs; CHANGE PRINT SETTINGS, which is for changing the print settings (layout settings, finishing settings, etc.) of an individual job or combined job; MOVE TO TOP, in which the print sequence of a certain job is changed so that the job is processed first; MOVE TO PREVIOUS, in which the print sequence of a certain job is changed to move up the job by one job; MOVE TO NEXT, in which the print sequence of a certain job is changed to move down the job by one job; and MOVE TO LAST, in which the print sequence of a certain job is changed so that the job is processed last.

In a case where preview of a certain individual job or combined job has been designated on the window screen (FIG. 16) of the spool file manager 304, the previewer 306 is loaded and the previewer 306 is instructed to execute processing for previewing the job of intermediate code described in the spool file 303.

The previewer 306 sequentially reads in the page description file (PDF) of intermediate code included in the spool file 303, manipulates the data in accordance with the manipulation settings information included in the job settings file (SDF) stored in the spool file 303, and outputs the GDI functions to the graphic engine 202. The graphic engine 202 outputs the rendered data to its own client area, thereby making it possible to produce an output on the screen.

Further, it is possible for the graphic engine 202 to perform appropriate rendering in conformity with the designated printer. This means that in a manner similar to that of the despooler 305, the previewer 306 can be implemented by a method of manipulating the intermediate code, which is contained in the spool file 303, in accordance with the content of the manipulation settings contained in the spool file 303, and outputting the results utilizing the graphic engine 202. The manipulation settings that have been configured by the printer driver 203 are stored in the spool file 303 as a job settings file and the data of the page description file is machined and output based upon the job settings file. As a result, depending upon how the actual rendering data is printed and, in a case where Nup (processing for reducing the size of N-number of physical pages to a single page, placing these on the single page and printing the same) has been designated, a case where double-sided printing has been designated, a case where duplicate printing has been designated and a case where stamping has been designated, the user can be provided with a print preview that closely approximates what will be output by the printer 1500.

It should be noted that the print preview function possessed by conventional application software for document creation or the like performs rendering based upon page settings in the application. As a consequence, the print settings at the printer driver 203 are not reflected and the user cannot be made to recognize a preview of printing that will actually be produced.

Figure 17:
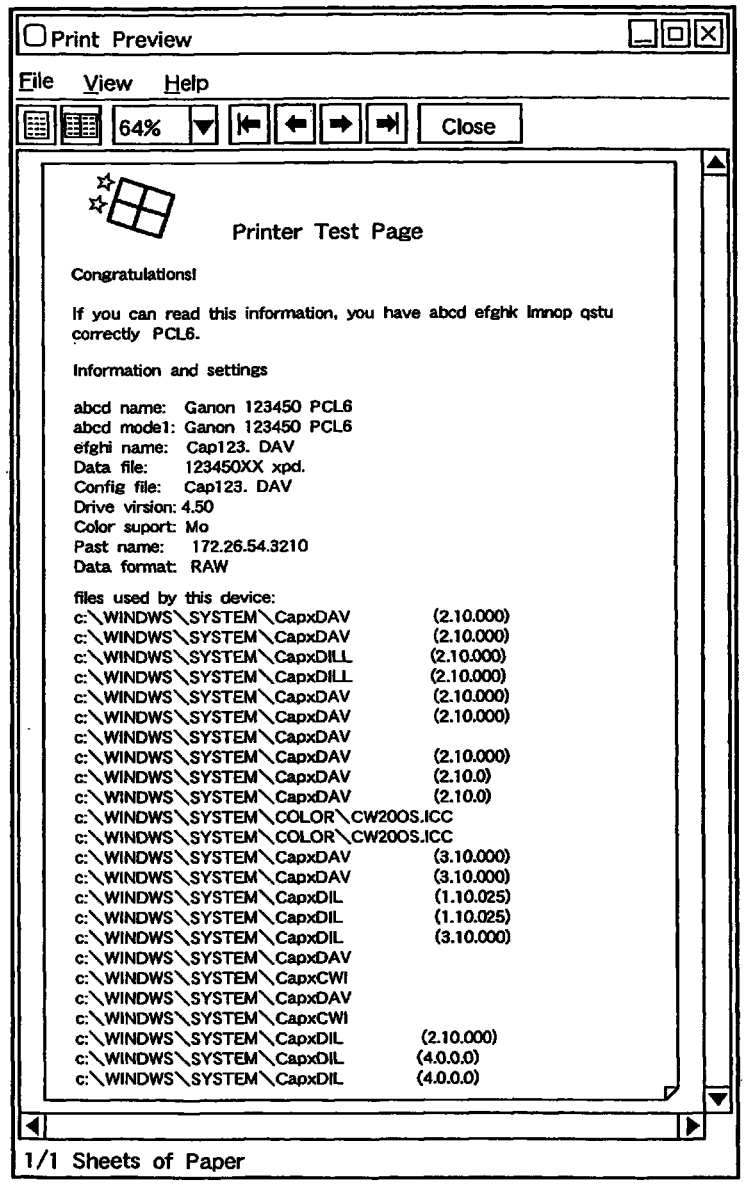
FIG. 17 is a diagram showing an example of a print preview screen according to the second embodiment.

By executing the preview processing as described above, a large preview of print manipulation settings contained in the spool file 303 will be displayed on the screen by the previewer 306, as shown in FIG. 17. Thereafter, in response to a command from the user to quit this display, the previewer 306 is closed and control shifts to the window screen (FIG. 16) of the spool file manager 304.

If the user performs printing in accordance with the content displayed by the previewer 306, a print request can be issued by designating "PRINT" or "PROOF PRINT" on the spool file manager 304. As described above, the print request is such that a page description file is manipulated by the despooler 305 based upon a job settings file to thereby generate the GDI function, the latter is sent to the graphic engine 202 and a print instruction is sent to the printer driver 203 via the dispatcher 301, whereby printing is executed.

Processing that follows the spooling of print data in a case where printing of print data with an accompanying password is performed in this spool system will be described with reference to the flowchart shown in FIG. 18.

Figure 18:
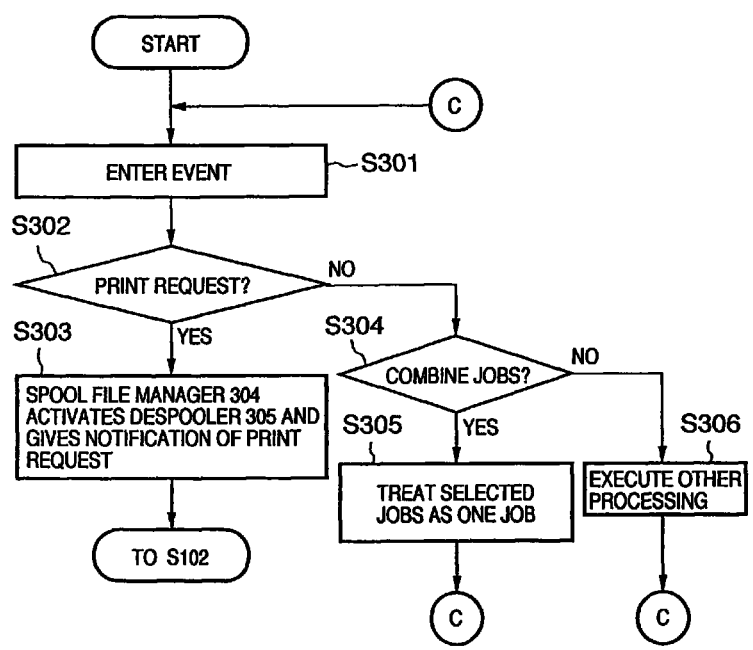
FIG. 18 is a flowchart illustrating print processing executed by the host computer according to the second embodiment.

FIG. 18 is a flowchart illustrating print processing executed by the host computer 3000 according to the second embodiment of the invention.

If the spool file manager 304 receives an event input at step S301, control proceeds to step S302, at which the spool file manager 304 discriminates the type of event. If the event is a print instruction, control proceeds to step S303; otherwise, control proceeds to step S304. The spool file manager 304 activates the despooler 305 and issues a print command at step S303. The despooler 305 at this time operates in the same manner as the application indicated by the flowchart of FIG. 13. As a result, the password information dialog screen for when printing is performed is presented again when a print request is sent to the printer driver 203 via the dispatcher 301.

If it is found at step S302 that a print request has not been issued, control proceeds to step S304, at which it is determined whether the input event is a request to combine jobs. If the answer is "YES", control proceeds to step S305; otherwise, control proceeds to step S306 and other processing is executed. At step S305, a plurality of selected jobs are treated as a combined job. More specifically, a print request is issued (the processing of step S303 is executed) one time by the single despooler 305 for the spool file 303 of these multiple jobs.

It should be noted that since the print data from the application 201 is delivered to the spooler 302 by the dispatcher 301, data has not been sent to the printer driver 203 at this time. That is, even in a case where a plurality of jobs are combined and printed as in FIG. 16, display of a dialog screen is not presented for each job that prevailed prior to being combined. Rather, a dialog screen is displayed after the jobs are combined into a single job.

The processing method of the spool system in a case where the cancel button 1105 of FIG. 11 is clicked through a method similar to that of the first embodiment will be described with reference to the flowchart of FIG. 19.

Figure 19:
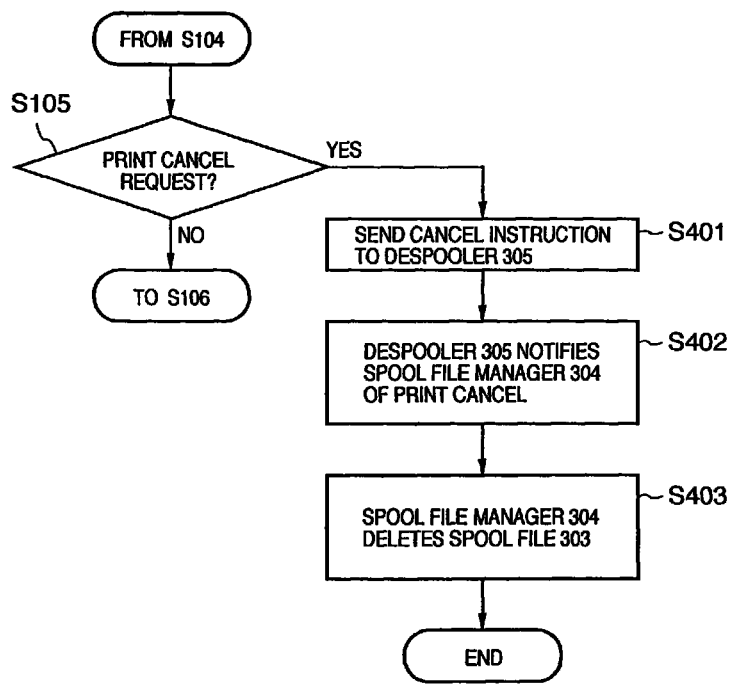
FIG. 19 is a flowchart illustrating print processing executed by the host computer according to the second embodiment.

FIG. 19 is a flowchart which basically illustrates processing in a case where the cancel button 1105 is clicked in the flowchart of FIG. 13.

Processing after a print cancel request has been entered at step S105 differs from that of the flowchart of FIG. 13. If a print cancel request has been entered, control proceeds to step S401, at which an instruction for canceling printing is delivered to the despooler 305 and not the application 201. Next, at step S402, the despooler 305 notifies the spool file manager 304 of cancellation of printing and unloads the program from the RAM 2. Control then proceeds to step S403, at which the spool file manager 304 erases the spool file 303 that was generated by the despooler 302 and unloads the RAM 2. As a result, even in a case where the spool system is expanded in a job accounting system, job accounting is carried out without holding the spool file 303 in the external memory 11.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the embodiments and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc. Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiments.

Thus, in accordance with the present invention, as described above, a printing system in which a password is assigned to a print job and a printout is obtained by a printer by inputting the password is provided with means for changing a user name or a document name. This has the effect of enhancing the security of documents stored in a printer.

The present invention is not limited to the above embodiments and various changes and modifications can be made within the spirit and scope of the present invention. Therefore, to apprise the public of the scope of the present invention, the following claims are made.

What is claimed is:

1. A printing control method of a print system including a print control apparatus having a memory storing a printer driver for generating a printer control command based on print data and transmitting the printer control command to a printing apparatus, the method comprising:
   designating, by the print control apparatus, a secured print which requests a password for printing of the printer control command based on the print data;
   displaying, by the print control apparatus, on a display unit of the print control apparatus, a setting screen to enter a document name for the printer control command based on the print data, that is to be displayed on the printing apparatus before the password for the secured print of the printer control command based on the print data is entered at the printing apparatus;
   generating, by the print control apparatus, the printer control command for the secured print based on the print data and the document name entered via the setting screen, when the secured print is designated and the document name is entered via the setting screen;
   transmitting, by the print control apparatus, the generated printer control command for the secured print to the printing apparatus; and
   displaying, by the printing apparatus, the document name before the password is entered at the printing apparatus,
   wherein the document name is set as setting processing for printing after a screen of the printer driver is dislplayed.

2. The method according to claim 1, wherein the setting screen to enter the document name and a password is displayed.

3. The method according to claim 1, wherein the setting screen is displayed in response to an issuance of a print instruction from an application that outputs the print data.

4. The method according to claim 1, wherein the document name is different from an original document name of the print data.

5. The method according to claim 1, wherein the printer control command for the secured print is generated such that the printing apparatus waits for outputting of a printing material based on the printer control command for the secured print until a predetermined password is input on the printing apparatus, when the secured print is designated.

6. The method according to claim 1, wherein the document names of the printer control commands for the secured print designated by multiple users are displayed on the printing apparatus before the password is entered at the printing apparatus, the document names including the document name.

7. The method according to claim 1, wherein the setting screen is displayed by the printer driver.

8. A print system including a printing control apparatus having a CPU and a memory storing a printer driver for generating a printer control command based on print data and transmitting the printer control command to a printing apparatus, the printing control apparatus comprising:
a designating unit that designates a secured print which requests a password for printing of the printer control command based on the print data;
a display control unit that displays a setting screen to enter a document name for the printer control command based on the print data, that is to be displayed on the printing apparatus before the password for the secured print of the printer control command based on the print data is entered at the printing apparatus;
a generation unit that generates the printer control command for the secured print based on the print data and the document name entered via the setting screen, when the secured print is designated and the document name is entered via the setting screen; and
a transmitting unit that transmits the printer control command for the secured print generated by the generating unit to the printing apparatus,
the printing apparatus comprising:
a displaying unit that displays the document name before the password is entered at the printing apparatus,
wherein the document name is set as setting processing for printing after a screen of the printer driver is displayed.

9. The print system according to claim 8, wherein the display control unit of the printing control apparatus displays the setting screen to enter the document name and a password.

10. The print system according to claim 8, wherein the display control unit of the printing control apparatus displays the setting screen in response to an issuance of a print instruction from an application that outputs the print data.

11. The print system according to claim 8, wherein the document name is different from an original document name of the print data.

12. The print system according to claim 8, wherein the generation unit generates the print control command for the secured print such that a printing material based on the printer control command for the secured print is not output until a predetermined password is input on the printing apparatus, when the secured print is designated.

13. The print system according to claim 8, wherein the document names of the printer control commands for the secured print designated by multiple users are displayed on the printing apparatus before the password is entered at the printing apparatus, the document names including the document name.

14. The print system according to claim 8, wherein the setting screen is displayed by the printer driver.

15. A printing control method of a print system including a print control apparatus having a memory storing a printer driver for generating a printer control command based on print data and transmitting the printer control command to a printing apparatus, the method comprising:
designating, by the print control apparatus, a secured print which requests a password for printing of the printer control command based on the print data;
displaying, by the print control apparatus, on a display unit of the print control apparatus, a setting screen to enter user information for the printer control command based on the print data, that is to be displayed on the printing apparatus before the password for the secured print is entered at the printing apparatus;
generating, by the print control apparatus, the printer control command for the secured print based on the print data and the user information entered via the setting screen, when the secured print is designated and the user information is entered via the setting screen;
transmitting, by the print control apparatus, the generated printer control command for the secured print to the printing apparatus; and
displaying, by the printing apparatus, the user information before the password is entered at the printing apparatus,
wherein the user information is set as setting processing for printing after a screen of the printer driver is displayed.

16. The method according to claim 15, wherein the setting screen to enter a user name as the user information and a password is displayed.

17. The method according to claim 15, wherein the setting screen is displayed in response to an issuance of a print instruction from an application that outputs the print data.

18. The method according to claim 15, wherein the printer control command for the secured print is generated such that the printing apparatus waits for outputting of a printing material based on the printer control command for the secured print until a predetermined password is input on the printing apparatus, when the secured print is designated.

19. The method according to claim 15, wherein the setting screen for entering the user information and a document name to be displayed on the printing apparatus before the password for the secured print is entered at the printing apparatus is displayed.

20. The method according to claim 15, wherein the user information of the printer control commands for the secured print designated by multiple users is displayed on the printing apparatus before the password is entered at the printing apparatus, the user information including the user information.

21. The method according to claim 15, wherein the setting screen is displayed by the printer driver.

22. A print system including a printing control apparatus having a memory storing a printer driver for generating a printer control command based on print data and transmitting the printer control command to a printing apparatus,
the printing control apparatus comprising:
a designation unit that designates a secured print which requests a password for printing of the printer control command based on the print data;
a display unit that displays a setting screen to enter user information for the printer control command based on the print data, that is to be displayed on the printing apparatus before the password for the secured print is entered at the printing apparatus;
a generation unit that generates the printer control command for the secured print based on the print data and the user information entered via the setting screen, when the secured print is designated and the user information is entered via the setting screen; and
a transmission unit that transmits the printer control command for the secured print generated by the generation unit,
the printing apparatus comprising:
a display unit that displays the user information before the password is entered at the printing apparatus, wherein the user information is set as setting processing for printing after a screen of the printer driver is displayed.

23. The print system according to claim 22, wherein the display unit of the printing control apparatus displays the setting screen to enter a user name as the user information and a password.

24. The print system according to claim 22, wherein the display unit of the printing control apparatus displays the setting screen in response to an issuance of a print instruction from an application that outputs the print data.

25. The print system according to claim 22, wherein the generation unit generates the printer control command for the secured print such that the printing apparatus waits for outputting of a printing material based on the printer control command for the secured print until a predetermined password is input on the printing apparatus, when the secured print is designated.

26. The print system according to claim 22, wherein the display unit displays the setting screen for entering the user information and a document name to be displayed on the printing apparatus before the password for the secured print is entered at the printing apparatus.

27. The print system according to claim 22, wherein the user information of the printer control commands for the secured print designated by multiple users is displayed on the printing apparatus before the password is entered at the printing apparatus, the user information including the user information.

28. The print system according to claim 22, wherein the setting screen is displayed by the printer driver.

29. A non-transitory computer-readable storage medium encoded with computer executable instructions, which when executed implement a printing control method of a print system including a print control apparatus that generates a printer control command and transmits the printer control command to a printing apparatus, the method comprising:
    designating, by the print control apparatus, a secured print which requests a password for printing of the printer control command based on the print data;
    displaying, by the print control apparatus, on a display unit of the print control apparatus, a setting screen to enter user information for the printer control command based on the print data, that is to be displayed on the printing apparatus before the password for the secured print is entered at the printing apparatus;
    generating, by the print control apparatus, the printer control command for the secured print based on the print data and the user information entered via the setting screen, when the secured print is designated and the user information is entered via the setting screen;
    transmitting, by the print control apparatus, the generated printer control command for the secured print to the printing apparatus, and
    displaying, by the printing apparatus, the user information before the password is entered at the printing apparatus,
    wherein the user information is set as setting processing for printing after a screen of the printer driver is displayed.

30. The storage medium according to claim 29, wherein the setting screen to enter a user name as the user information and a password is displayed.

31. The storage medium according to claim 29, wherein the setting screen is displayed in response to an issuance of a print instruction from an application that outputs the print data.

32. The storage medium according to claim 29, wherein the printer control command for the secured print is generated such that the printing apparatus waits for outputting of a printing material based on the printer control command for the secured print until a predetermined password is input on the printing apparatus, when the secured print is designated.

33. The storage medium according to claim 29, wherein the setting screen for entering the user information and a document name to be displayed on the printer before the password for the secured print is entered at the printing apparatus is displayed.

34. The storage medium according to claim 29, wherein the user information of the printer control commands for the secured print designated by multiple users is displayed on the printing apparatus before the password is entered at the printing apparatus, the user information including the user information.

35. The storage medium according to claim 29, wherein the setting screen is displayed by the printer driver.

36. A printing control method of a print control apparatus having a CPU and generating a printer control command based on data from an application and transmitting the printer control command to a printing apparatus, the print control apparatus can communicate with the printing apparatus, the method comprising:
    designating a secured print which requests a password for printing of the printer control command;
    displaying on a display unit of the print control apparatus, a setting screen to enter a document name for the printer control command, wherein the document name entered via the setting screen is displayed on the printing apparatus before the password for the secured print of the printer control command is entered at the printing apparatus;
    generating the printer control command for the secured print based on the data from the application and the document name entered via the setting screen, when the secured print is designated and the document name is entered via the setting screen; and
    transmitting the generated printer control command for the secured print to the printing apparatus,
    wherein the document name is set as setting processing for printing after a screen of a printer driver is displayed.

37. The method according to claim 36, wherein the setting screen to enter the document name and a password is displayed.

38. The method according to claim 36, wherein the setting screen is displayed in response to an issuance of a print instruction from an application that outputs the data.

39. The method according to claim 36, wherein the document name is different from an original document name of the data from the application.

40. The method according to claim 36, wherein the setting screen is displayed by the printer driver.

41. A non-transitory computer-readable storage medium storing a computer program product, which is executed to implement a printing control method of a print control apparatus that generates a printer control command based on data from an application and transmits the printer control command to a printing apparatus, the print control apparatus can communicate the printing apparatus, the method comprising:
    designating a secured print which requests a password for printing of the printer control command;
    displaying on a display unit of the print control apparatus a setting screen to enter a document name for the printer control command, wherein the document name entered via the setting screen is displayed on the printing apparatus before the password for the secured print of the printer control command is entered at the printing apparatus;

generating the printer control command for the secured print based on the data from the application and the document name entered via the setting screen, when the secured print is designated and the document name is entered via the setting screen; and transmitting the printer control command for the secured print to the printing apparatus, wherein the document name is set as setting processing for printing after a screen of a printer driver is displayed.

42. The storage medium according to claim 41, wherein the setting screen to enter the document name and a password is displayed.

43. The storage medium according to claim 41, wherein the setting screen is displayed in response to an issuance of a print instruction from the application that outputs the data.

44. The storage medium according to claim 41, wherein the document name is different from an original document name of the data from the application.

45. The storage medium according to claim 41, wherein the setting screen is displayed by the printer driver.

46. A printing control apparatus having a CPU and generating a printer control command based on data from an application and transmitting the printer control command to a printing apparatus, the print control apparatus can communicate the printing apparatus, comprising:

a designating unit that designates a secured print which requests a password for printing of the printer control command;

a display control unit that displays a setting screen to enter a document name for the printer control command, wherein the document name entered via the setting screen is displayed on the printing apparatus before the password for the secured print of the printer control command is entered at the printing apparatus;

a generation unit that generates the printer control command for the secured print based on the data from the application and the arbitrary document name entered via the setting screen, when the secured print is designated and the document name is entered via the setting screen; and a transmitting unit that transmits the printer control command for the secured print generated by the generating unit to the printing apparatus, wherein the document name is set as setting processing for printing after a screen of a printer driver is displayed.

47. The apparatus according to claim 46, wherein the setting screen to enter the document name and a password is displayed.

48. The apparatus according to claim 46, wherein the setting screen is displayed in response to an issuance of a print instruction from the application that outputs the data.

49. The apparatus according to claim 47, wherein the document name is different from an original document name of the data from the application.

50. The apparatus according to claim 46, wherein the setting screen is displayed by the printer driver.

51. A printing control method of a print control apparatus having a CPU and generating a printer control command based on data from an application and transmitting the printer control command to a printing apparatus, the print control apparatus can communicate the printing apparatus, the method comprising:

designating a secured print which requests a password for printing of the printer control command;

displaying on a display unit of the print control apparatus, a setting screen to enter user information for the printer control command, wherein the user information entered via the setting screen is displayed on the printing apparatus before the password for the secured print of the printer control command is entered at the printing apparatus;

generating the printer control command for the secured print based on the data from the application and the user information entered via the setting screen, when the secured print is designated and the user information is entered via the setting screen; and transmitting the generated printer control command for the secured print to the printing apparatus, wherein the user information is set as setting processing for printing after a screen of a printer driver is displayed.

52. The method according to claim 51, wherein the setting screen to enter a user name as the user information and a password is displayed.

53. The method according to claim 51, wherein the setting screen is displayed in response to an issuance of a print instruction from the application that outputs the data.

54. The method according to claim 51, wherein the user information is different from original user information of the data from the application.

55. The method according to claim 51, wherein the setting screen is displayed by the printer driver.

56. A non-transitory computer-readable storage medium storing a computer program product, which is executed to implement a printing control method of a print control apparatus that generates a printer control command based on data from an application and transmits the printer control command to a printing apparatus, the print control apparatus can communicate the printing apparatus, the method comprising:

designating a secured print which requests a password for printing of the printer control command;

displaying on a display unit of the print control apparatus a setting screen to enter user information for the printer control command, wherein the user information entered via the setting screen is displayed on the printing apparatus before the password for the secured print of the printer control command is entered at the printing apparatus;

generating the printer control command for the secured print based on the data from the application and the user information entered via the setting screen, when the secured print is designated and the user information is entered via the setting screen; and transmitting the printer control command for the secured print to the printing apparatus, wherein the user information is set as setting processing for printing after a screen of a printer driver is displayed.

57. The storage medium according to claim 56, wherein the setting screen to enter a user name as the user information and a password is displayed.

58. The storage medium according to claim 56, wherein the setting screen is displayed in response to an issuance of a print instruction from the application that outputs the data.

59. The storage medium according to claim 56, wherein the user information is different from original user information of the data from the application.

60. The apparatus according to claim 56, wherein the setting screen is displayed by the printer driver.

61. A printing control apparatus having a CPU and generating a printer control command based on data from an application and transmitting the printer control command to a printing apparatus, wherein the print control apparatus can communicate with the printing apparatus, comprising:

a designating unit that designates a secured print which requests a password for printing of the printer control command;

a display control unit that displays a setting screen to enter user information for the printer control command, wherein the user information entered via the setting screen is displayed on the printing apparatus before the password for the secured print of the printer control command is entered at the printing apparatus;

a generation unit that generates the printer control command for the secured print based on the data from the application and the user information entered via the setting screen, when the secured print is designated and the user information is entered via the setting screen; and a transmitting unit that transmits the printer control command for the secured print generated by the generating unit to the printing apparatus, wherein the user information is set as setting processing for printing after a screen of a printer driver is displayed.

62. The apparatus according to claim 61, wherein the setting screen to enter a user name as the user information and a password is displayed.

63. The apparatus according to claim 61, wherein the setting screen is displayed in response to an issuance of a print instruction from the application that outputs the data.

64. The apparatus according to claim 61, wherein the user information is different from original user information of the data from the application.

65. The apparatus according to claim 61, wherein the setting screen is displayed by the printer driver.

66. A printing control method of a print control apparatus having a CPU and generating a printer control command based on data from an application and transmitting the printer control command to a printing apparatus, the print control apparatus being communicable with the printing apparatus, the method comprising:

designating, by the print control apparatus, a secured print which requests a password for printing of the printer control command;

displaying, by the print control apparatus, on a display unit of the print control apparatus, a print setting screen to set print setting information and a setting screen to enter user information for the printer control command, wherein the user information entered via the setting screen is displayed on the printing apparatus before the password for the secured print of the printer control command is entered at the printing apparatus;

generating, by the print control apparatus, the printer control command for the secured print based on the data from the application, the print setting information and the user information, when the secured print is designated and the user information is entered via the setting screen; and transmitting, by the print control apparatus, the generated printer control command for the secured print to the printing apparatus, wherein the print setting screen and the setting screen are displayed by a printer driver.

67. The method according to claim 66, wherein the setting screen to enter a user name as the user information and a password is displayed.

68. The method according to claim 66, wherein the setting screen is displayed in response to an issuance of a print instruction from the application that outputs the data.

69. The method according to claim 66, wherein the user information is different from original user information of the data from the application.

70. A non-transitory computer-readable storage medium storing a computer program product, which is executed to implement a printing control method of a print control apparatus that generates a printer control command based on data from an application, the print control apparatus being communicable with a printing apparatus, the method comprising:

designating, by the print control apparatus, a secured print which requests a password for printing of the printer control command;

displaying, by the print control apparatus, on a display unit of the print control apparatus, a print setting screen to set print setting information and a setting screen to enter user information for the printer control command, wherein the user information entered via the setting screen is displayed on the printing apparatus before the password for the secured print of the printer control command is entered at the printing apparatus;

generating, by the print control apparatus, the printer control command for the secured print based on the data from the application, the print setting information and the user information, when the secured print is designated and the user information is entered via the setting screen; and transmitting, by the print control apparatus, the generated printer control command for the secured print to the printing apparatus, wherein the print setting screen and the setting screen are displayed by a printer driver.

71. The storage medium according to claim 70, wherein the setting screen to enter a user name as the user information and a password is displayed.

72. The storage medium according to claim 70, wherein the setting screen is displayed in response to an issuance of a print instruction from the application that outputs the data.

73. The storage medium according to claim 70, wherein the user information is different from original user information of the data from the application.

* * * * *